United States Patent [19]

Clifford

[11] 3,734,172

[45] May 22, 1973

[54] ELECTROSTATIC CONTROL METHOD AND APPARATUS

[75] Inventor: Richard P. Clifford, Newport Beach, Calif.

[73] Assignee: TRW Inc., Redondo Beach, Calif.

[22] Filed: Jan. 3, 1972

[21] Appl. No.: 214,900

[52] U.S. Cl. ................................165/96, 165/135
[51] Int. Cl. ..........................F28f 13/00, F28f 27/00
[58] Field of Search ..........................165/96, 135, 1; 236/1 F; 310/6

[56] References Cited

UNITED STATES PATENTS 3,244,224   4/1966   Hnilicka, Jr. ..........................165/32

Primary Examiner—William E. Wayner
Attorney—Daniel T. Anderson et al.

[57] ABSTRACT

An electrostatic control method and apparatus wherein a potential difference is impressed across two or more electrically conductive members which are electrically isolated from one another to provide the adjacent members with opposite electrical polarity and thereby create an electrostatic force urging the members together against the resistance of an opposing resilient force. The potential difference is adjusted to effect relative positioning of the members through a range of positions under the conjoint action of the electrostatic force and the opposing force. The disclosed inventive embodiment is a thermal barrier composed of multiple thermal insulating layers which are electrostatically positioned to regulate the thermal conductance of the barrier.

8 Claims, 2 Drawing Figures

PATENTED MAY 22 1973 3,734,172

ELECTROSTATIC CONTROL METHOD AND APPARATUS

BACKGROUND OF THE INVENTION

1. Field of the Invention

This invention relates generally to the field of electrostatic and more particularly to a novel electrostatic control method and apparatus for electrostatically positioning electrically conductive members relative to one another.

2. Prior Art

Electrostatically controlled relays are known in the art. These relays have a movable contact which is positioned electrostatically rather than electromagnetically as in a conventional electromagnetic relay. Thus, in an electrostatic relay, the movable contact is retained in a normal position by spring action and is movable to a second position by electrostatic force. This force is created by impressing across the contact and a part of the relay toward which the contact moves to its second position a potential difference which charges the contact and part to opposite electrical polarity. The contact is returned to normal position by spring action by short circuiting the contact and part to remove their opposite charges.

Such relays are essentially two position devices wherein the electrostatically positioned element, i.e. the movable contact, has only two possible positions. Examples of these relays are found in U.S. Pat. Nos.:

| | | |
|---|---|---|
| 459,678 | 913,541 | 1,974,483 |
| 2,232,143 | 2,568,824 | 2,885,509 |
| 2,885,511 | 2,927,255 | 2,942,077 |
| 2,949,550 | 3,004,126 | 3,385,793 |
| 3,147,390 | | |

SUMMARY OF THE INVENTION

The present invention provides an electrostatic control method and apparatus for electrostatically positioning two or more electrically conductive members through a range of positions and/or positioning two or more members in response to a selected monitored parameter. To this end, the electrostatic control apparatus has two or more electrically conductive members which are spaced along and movable relative to one another along a given direction line. The members are urged apart by spring action. Means are provided for impressing a potential difference between the members such that the adjacent members are charged to opposite electrical polarity so as to create an electrostatic force which urges the members togehter against the opposing spring force. The potential difference is variable to vary the electrostatic force and thereby position the members relative to one another through a range of positions under the conjoint action of the electrostatic force and the opposing spring force.

The disclosed inventive embodiment is a thermal barrier wherein the electrostatically positioned members are sheets of crumpled thermal insulation, such as crumpled plastic film with a metallized coating on one surface. These sheets are disposed in contacting face-to-face relation, such that the adjacent sheets contact one another only at a limited number of local contact points provided by the crumpled or wrinkles in the films. The contacting wrinkles act as srpings of a sort which yieldably urge the insulating sheets apart.

A d-c charging circuit is provided having a positive thermal connected to the metallized coating of alternate sheets and a negative thermal connected to the metallized coating of the intervening sheets. This charging circuit creates between the sheets a potential difference which electrically charges the adjacent sheets to opposite electrical polarity to create an electrostatic force for urging the sheets together. Included in the charging circuit are means for regulating the potential difference to effect relative positioning of the insulating sheets for the purpose of controlling or regulating the thermal conductance of the thermal barrier. Thus increasing the potential difference compresses or compacts the sheets, i.e., urges the sheets into more intimate contact, to increase the thermal conductance of the barrier. Reducing or removing the potential difference permits the sheets to spring apart to reduce the thermal conductance of the barrier.

The disclosed thermal barrier is used to automatically control or regulate thermal energy transfer between two thermal regions located at opposite sides of the barrier for for purpose of regulating the temperature in one region. To this end, the charging circuit for for the barrier is equipped with means for sensing the temperature in the regulated region and controlling the potential difference impressed on and thereby the thermal conductance of the barrier in response to changes in the sensed temperature. A primary application of the invention, for example, involves use of the thermal barrier as a thermal radiator on a spacecraft to effect automatic control of the temperature in the spacecraft. In this application, the thermal conductance of the thermal barrier is regulated to regulate heat rejection from the spacecraft to ambient space in response to the temperature within the spacecraft.

The invention is also capable of other applications. For example, the invention may be utilized to provide an electrostatically controlled variable capacitor wherein the electrostatically positioned members are the capacitor plates.

DESCRIPTION OF THE PREFERRED EMBODIMENTS

Figures 1, 2:
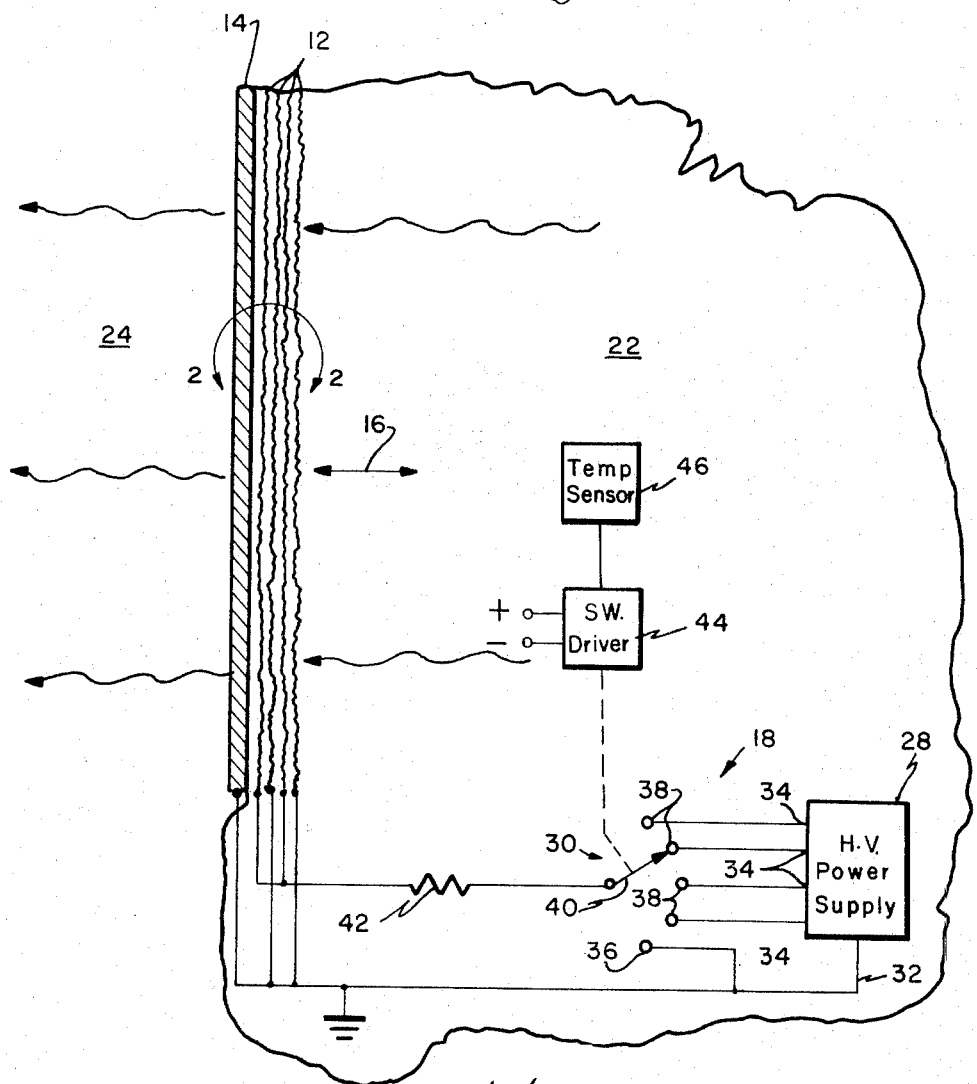
FIG. 1 illustrates an automatic electrostatic temperature control system according to the invention.
FIG. 2 is an enlargement of the area encircled by the arrow 2—2 in FIG. 1.

The illustrated electrostatic control system 10 has a number of electrically conductive members 12, 14 disposed side-by-side along a common axis 16 and movable toward and away from one another along the axis. Members 12, 14 are electrically isolated from one another and are urged apart by a spring force which normally retains the members in relatively separated positions. An electrical charging circuit 18 is connected to the members for impressing on the members a potential difference which electrically charges the adjacent members to opposite electrical polarity. An electrostatic attractive force is thereby created on the members which urges the members together. Included in the charging circuit are means 20 for regulating the potential difference to effect relative positioning of the members along the axis 16 under the conjoint action of the electrostatic force and opposing spring force.

The particular electrostatic control system 10 illustrated is a temperature control system for regulating thermal energy transfer between two thermal regions 22 and 24. In this application, the electrostatically positioned members 12, 14 provide a thermal barrier 26 which is located between the thermal regions and whose thermal conductance is electrostatically regulated to regulate thermal energy transfer between the regions and thereby the temperature in one region.

For example, in this disclosure, thermal region 22 is assumed to be the interior of a spacecraft and thermal region 24 is assumed to be ambient space. Thermal barrier 26 provides a thermal radiator which absorbs heat from the spacecraft interior 22 and radiates the heat to space 24.

Referring in more detail to the thermal control system illustrated, the electrostatically positioned members 12 of the thermal barrier 26 comprise sheets or layers of thermal insulation, such as crumpled plastic films with a metallized coating on one surface. These layers are disposed in contacting face-to-face relation along the axis 16. Member 14 of the thermal barrier is an external radiator in the form of a metal plate or the like. It is important to note here that the barrier layers 12, 14 have been shown as spaced for the sake of clarity. In actual practice, however, the layers will contact one another at local contact points provided by the crumples or wrinkles in the layer sheets. These contacting wrinkles provide springs of a sort which exert on the layers spring forces for urging the layers apart. The inner surface of the innermost layer 12 is blackened to provide an efficient thermal absorption surface. Thermal energy transfer from the region 22 to the region 24 occurs by radiation to the innermost barrier layer 12, then by conduction and radiation through the layers 12, 14, and finally by radiation from the outermost layer 14.

Charging circuit 18 as a high voltage d-c power supply 28 and a voltage regulating switch 30. Power supply 28 has a negative terminal 32 and a number of positive terminals 34 at different voltage levels. Negative terminal 32 is connected to a stationary contact 36 of a swtich 30 and to the metallized coating of alternate layers of the thermal barrier 26 including the outer layer or radiator plate 14. The positive terminals 34 of the power supply are connected to stationary contacts 38 of swtich 30. Switch 30 as a movable contact 40 connected to the metallized coating of the remaining intervening layers of the thermal barrier 26 through a current limiting resistor 42. The adjacent barrier layers are electrically isolated from one another, as by arranging the layers 12 with their metallized coatings facing away from radiator 14, such that the adjacent layers are insulated from one another by thier plastic film.

From the description thus far, it is evident that movement of the movable contact 40 to any one of the switch contacts 38 impresses on the thermal barrier layers 12, 14 a potential difference which electrically charges the adjacent layers to opposite polarity. This potential difference creates an electrostatic force on the barrier layers which urges the layers together, i.e., compacts or compresses the layers, against the action of the spring force which urges the layers apart. The layers are thus effectively positioned relative to one another by the conjoint action of the electrostatic force and opposing spring force on the layers. Compression of the barrier layers in this way provides more total contact surface area between the adjacent layers and thereby increases the thermal conductance of the barrier. Since the electrostatic compression force and hence thermal conductance increases with the potential difference impressed between the layers, the thermal conductance of the thermal barrier may be regulated or varied by moving the switch contact 40 from one stationary contact 38 to another.

The thermal conductance of the thermal barrier 26 is reduced to a minimum by moving the switch contact 40 to stationary contact 36. The several thermal barrier layers 12, 14 are thereby short circuited through the current limiting resistor 42 to remove or dissipate the electrical charges on the layers. The layers then separate under spring action to their normal minimum conductance positions. The voltages impressed on the thermal barrier layers 12, 14 will vary from one application to another depending on factors such as the material of the layers, their size and thickness, and other factors. A typical mean voltage level, however, may be on the order of 300 Vdc.

In the particular embodiment shown, the switch 30 is actuated automatically in response to the temperature in region 22 to maintain this temperature relatively constant. To this end, the movable switch contact 40 is connected to a driver 44 controlled by a temperature sensor 46 within the region 22. Driver 44 positions the switch contact 40 in response to temperature changes in the region 22 in such a way that increasing temperature effects movement of the contact to increase the voltage applied to and thereby the thermal conductance of the thermal barrier and thereby increase heat rejection through the barrier to the outer space region 24. A decrease in the temperature within the region 22 has the opposite effect.

In the particular electrostatically controlled thermal barrier illustrated, the outer radiator layer 14 may form an integal part of the barrier or it may be the outer skin of the spacecraft. A thermal barrier according to the invention may also be formed by applying a single electrostatically controlled layer about a metallic object to be thermally controlled. In this case, the wall of the object forms the second layer of the thermal barrier.

What is claimed is:

1. Electrostatic thermal control apparatus comprising:

a thermal barrier including at least two electrically conductive thermal insulating layers electrically isolated from one another and disposed side-by-side for relative movement toward and away from one another;

means providing a spring force between the adjacent layers urging the layers apart;

means for impressing a potential difference between said layers in a manner such that the adjacent layers are electrically charged to opposite electrical polarity to create an electrostatic attractive force between said layers for urging said layers together; and means for regulating said potential difference to effect relative positioning of said layers under the conjoint action of said electrostatic and spring forces and thereby regulate the thermal conductance of said barrier.

2. An electrostatic control according to claim 1 wherein:

said control includes at least three layers spaced along a common axis along which said layers are movable toward and away from one another.

3. An electrostatic thermal control apparatus according to claim 1 wherein:

said layers comprise wrinkled sheets of plastic film having a metallic coating on one surface, whereby each layer has a wrinkled electrically conductive surface provided by its metallic coating and an opposite wrinkled electrical insulating surface provided by its plastic film;

said layers are arranged face to face with the wrinkled conductive and insulating surfaces of adjacent layers in contact; and said potential difference is adjustable to regulate the thermal conductance of said barrier by regulating the contact pressure and thereby the total effective surface area contact between adjacent layers.

4. An electrostatic thermal control apparatus according to claim 1 including:

a first region at one side of said barrier between which and a second region at the opposite side of said barrier thermal energy transfer is adapted to occur through said barrier; and means for sensing the temperature within said first region and operating said control means in response to changes in said temperature to control the temperature within said first region.

5. The electrostatic control method which comprises the steps of:

placing in side-by-side relation at least two electrically conductive thermal insulating layers which are electrically isolated from one another and are relatively movable toward and away from one another to provide a thermal barrier whose thermal conductance may be regulated by relative movement of the layers toward and away from one another;

impressing a potential difference between said layers in a manner such that the adjacent layers are electrically charged to opposite electrical polarity, whereby said potential difference produces an electrostatic attractive force between said layers for urging the layers together; and regulating said potential difference to effect relative positioning of said layers under the conjoint action of said electrostatic and spring forces and thereby vary the thermal conductance of said barrier.

6. The electrostatic control method according to claim 5 wherein:

there are at least three layers disposed side-by-side along a common axis along which said layers are movable toward and away from one another.

7. The electrostatic control method according to claim 5 wherein:

said layers comprise wrinkled sheets of plastic film having a metallic coating on one surface, whereby each layer has a wrinkled electrically conductive surface provided by its metallic coating and an opposite wrinkled electrical insulating surface provided by its plastic film;

said layers are arranged face to face with the wrinkled conductive and insulating surfaces of adjacent layers in contact; and said potential difference is adjustable to regulate the thermal conductance of said barrier by regulating the contact pressure and thereby the total effective surface area contact between adjacent layers.

8. The electrostatic control method according to claim 5 wherein:

said barrier separates two regions at opposite sides of the barrier between which thermal energy transfer occurs through said barrier; and said method comprises the additional steps of sensing the temperature within one of said regions and regulating said potential difference in response to changes in said temperature to control the temperature within said one region.

* * * * *